United States Patent
Weeber et al.

(10) Patent No.: US 6,882,068 B2
(45) Date of Patent: Apr. 19, 2005

(54) FORCED AIR STATOR VENTILATION SYSTEM AND STATOR VENTILATION METHOD FOR SUPERCONDUCTING SYNCHRONOUS MACHINE

(75) Inventors: Konard Roman Weeber, Rexford, NY (US); Ian Arthur Hughes, Clifton Park, NY (US); Albert Eugene Steinbach, Schenectady, NY (US); Ronald James Chila, Glenville, NY (US)

(73) Assignee: General Electric Company, Schenectady, NY (US)

(*) Notice: Subject to any disclaimer, the term of this patent is extended or adjusted under 35 U.S.C. 154(b) by 34 days.

(21) Appl. No.: 10/265,716

(22) Filed: Oct. 8, 2002

(65) Prior Publication Data
US 2004/0066099 A1 Apr. 8, 2004

(51) Int. Cl.[7] .............................................. H02K 6/004
(52) U.S. Cl. ....................................................... 310/59
(58) Field of Search ..................................... 310/52–65

(56) References Cited

U.S. PATENT DOCUMENTS

| | | | |
|---|---|---|---|
| 3,932,778 A | * | 1/1976 | Watanabe et al. ............. 310/61 |
| 4,028,569 A | * | 6/1977 | Towne .......................... 310/64 |
| 4,347,451 A | * | 8/1982 | Mizuyama et al. ........... 310/59 |
| 4,352,034 A | * | 9/1982 | Karhan et al. ................ 310/59 |
| 4,396,847 A | * | 8/1983 | Weghaupt et al. ............ 310/52 |
| 4,426,592 A | * | 1/1984 | Berzin et al. ................. 310/52 |
| 4,609,840 A | | 9/1986 | Eats et al. |
| 5,214,325 A | | 5/1993 | Matson et al. |
| 5,548,168 A | | 8/1996 | Laskaris et al. |
| 5,633,543 A | * | 5/1997 | Jarczynski et al. ........... 310/59 |
| 5,652,469 A | | 7/1997 | Boardman et al. |
| 5,939,805 A | * | 8/1999 | Vanduyn ....................... 310/58 |
| 6,268,668 B1 | | 7/2001 | Jarczynski et al. |
| 6,346,755 B1 | | 2/2002 | Tong et al. |
| 6,412,289 B1 | | 7/2002 | Laskaris et al. |
| 6,426,574 B1 | * | 7/2002 | Hess et al. .................... 310/61 |
| 6,504,273 B1 | | 1/2003 | Tong |
| 6,552,452 B1 | | 4/2003 | Ferguson |
| 6,680,549 B1 | * | 1/2004 | Boardman et al. ........... 310/52 |
| 6,703,729 B1 | * | 3/2004 | Weeber et al. ................ 310/52 |

FOREIGN PATENT DOCUMENTS

| | | | | |
|---|---|---|---|---|
| JP | 01238446 | * | 3/1988 | ............ H02K/9/04 |
| JP | 04133641 | * | 9/1990 | ............ H02K/9/04 |

* cited by examiner

*Primary Examiner*—Darren Schuberg
*Assistant Examiner*—Heba Elkassabgi
(74) *Attorney, Agent, or Firm*—Nixon & Vanderhye, P.C.

(57) ABSTRACT

A synchronous electromagnetic machine is disclosed having: a rotor coupled to a rotor cooling system; a stator around the rotor and separated from the rotor by an annular gap between the rotor and an inner surface of the stator, wherein the stator includes stator cooling passages; a stator ventilation system in fluid communication with the stator cooling passages, and the ventilation system including a cooling fluid driving device such as a stator mounted fan.

22 Claims, 7 Drawing Sheets

FORCED AIR STATOR VENTILATION SYSTEM AND STATOR VENTILATION METHOD FOR SUPERCONDUCTING SYNCHRONOUS MACHINE

BACKGROUND OF THE INVENTION

The invention relates to ventilation system for synchronous electrical machines, such as generators and motors. In particular, the invention relates to a stator mounted cooling fan for a forced gas stator ventilation system for generators having superconducting rotors.

In the process of producing electricity, power generators create heat that must be dissipated from the generator. Heat occurs in generators due primarily to windage and friction, electric current flow, and time-varying magnetic fields in magnetic structures. Frictional heating occurs as the rotor spins at high speed in the generator. Heating also occurs as current flows through the rotor and stator coils, as they rotate relative to one another in the magnetic fields of the generator. Losses in the magnetic circuit occur as the magnetic fields change with time in permeable materials, such as for example in the stator core and the rotor poles of a synchronous generator.

Generators are conventionally equipped with cooling systems, such as a gas ventilation system, to transfer heat from the stator and rotor away from the generator. Gas ventilation cooling systems have been used in conventional generators and motors that do not employ superconducting coils. These generators and motors have stators and rotors that require cooling. The conventional gas ventilation systems tightly couple the cooling of stator and rotor by providing cooling gas to both. The ventilation system cools the rotor and stator by forcing cooling gas through gas passages in the rotor and stator. Conventional ventilation systems have employed forward flow and reverse flows of cooling gases through the stator and rotor.

In a forward flow ventilation scheme the cooling gas flows through the rotor and stator. The rotor expels cooling gas into the air gap, where the expelled rotor flow mixes with "fresh" gas. The "fresh" gas flows from the fan and moves axially through the air gap along the length of the machine. The combination of the "fresh" gas and expelled rotor flow, flow into the stator cooling passages and serve to cool the stator. In a reverse flow ventilation scheme the rotor expels cooling gas into the air gap, where the expelled rotor flow mixes with gas which is expelled from the stator cooling passages. The combined flow then moves axially along the length of the machine and exits through the fan. Both forward flow and reverse flow ventilation schemes tend to couple the cooling of rotor and stator.

Because of the coupling of the cooling gas flows through the rotor and stator, conventional forward and reverse flow ventilation systems are configured to provide adequate cooling for both the stator and rotor. To cool the rotor, some compromises may have to be made in a conventional ventilation system with respect to cooling the stator in order to accommodate cooling needs of the rotor, and vice versa. It may be difficult to optimize the cooling of the stator or rotor with a ventilation system that must provide cooling for both the rotor and stator. Nevertheless, ventilation systems have conventionally provided cooling for both the stator and rotor in large industrial and utility power generators.

The cryogenic cooling system for a superconducting rotor does not cool the stator. The stator of such a superconducting synchronous machine requires a separate stator cooling system. Contrary to conventional machines where stator and rotor cooling systems are coupled in a single ventilation system, the cooling system of the cryogenic rotor and the gas-cooled stator may be separate and independent.

BRIEF SUMMARY OF THE INVENTION

A stator ventilation system has been developed for a superconducting synchronous machine. The stator of a superconducting synchronous machine is cooled by a forced ventilation system in which a cooling gas, such as air or hydrogen, is forced from or into stator cooling passages by a stator mounted fan. The stator mounted fan can be controlled to cool the stator to a uniform temperature over a range of ambient temperatures, machine loads and other operating conditions. In addition, a conventional synchronous machine and ventilation system may be retrofit with a stator mounted fan to enhance the cooling of the stator, even where the ventilation system cools both the stator and rotor.

In a first embodiment, the invention is a synchronous machine comprising: a rotor coupled to a rotor cooling system; a stator around the rotor and separated from the rotor by an annular gap between the rotor and an inner surface of the stator, wherein the stator includes stator cooling passages; a stator ventilation system in fluid communication with the stator cooling passages, wherein the ventilation system includes a cooling fluid driving device arranged adjacent an outer periphery of the stator.

In another embodiment the invention is a superconducting electromagnetic machine comprising: a rotor having a cryogenically cooled superconducting rotor coil winding; a stator coaxial with the rotor and having stator coils magnetically coupled with the superconducting rotor coil winding, and the stator having cooling passages extending from an outer periphery of the stator to an inner periphery of the stator, the rotor having cooling passages for a cryogenic cooling fluid; a stator ventilation system providing cooling gas to the outer periphery of the stator and passages of the stator, and the stator ventilation system further comprises at least one fan mounted around an outer periphery of the stator.

In a further embodiment the invention is a method for cooling an electromagnetic machine having a rotor including a rotor coil winding and a stator and a stator ventilation system, the method comprising: cooling the rotor coil winding; cooling the stator with a cooling gas flowing through the stator included in the stator ventilation system, and drawing the cooling gas through the stator by at least one fan included in the stator ventilation system.

DETAILED DESCRIPTION OF THE INVENTION

In conventional generators with rotor mounted fans the cooling gas flow through the rotor is a function of speed. If such a generator that is rated at 60 Hz grid frequency (operation with a rotor speed of 3600 rpm for a 2-pole generator or 1800 rpm for a 4-pole generator) is operated at 50 Hz the rotor speed is reduced to 3000 rpm (2-pole) or 1500 rpm (4-pole) and the cooling gas flow is reduced roughly by the ratio 50/60. This reduces the heat removal capability of the generator, and hence the rating of the generator. It becomes difficult to accomplish identical generator output levels at both 50 and 60 Hz applications with a common generator design with conventional rotor mounted fans.

On the other hand, with stator mounted fans the coolant flow rate through the stator core, and hence the heat removal capability of the generator, is independent from the mechanical rotor speed. This allows to customize a generator design to 50 or 60 Hz operation through modifications to the external fan control module rather than changes in the electromagnetic design of the generator.

Since the air density is a function of elevation, the heat removal capability of air-cooled generators and hence the rating of air-cooled generators with rotor mounted fans is a function of elevation as well. As a result generators have to be de-rated if they are installed at higher elevation than they are designed for or rated at. A rough approximation is that the generator rating has to be reduced by up to 5% if the generator is operated at 1000 meter elevation compared to sea level. With a ventilation configuration of stator mounted fans the air flow through the generator can be increased to compensate for reduced air density and reduced heat removal capability as the elevation increases. This allows to maintain the generator rating independently of the elevation level of the generator installation.

Figure 1:
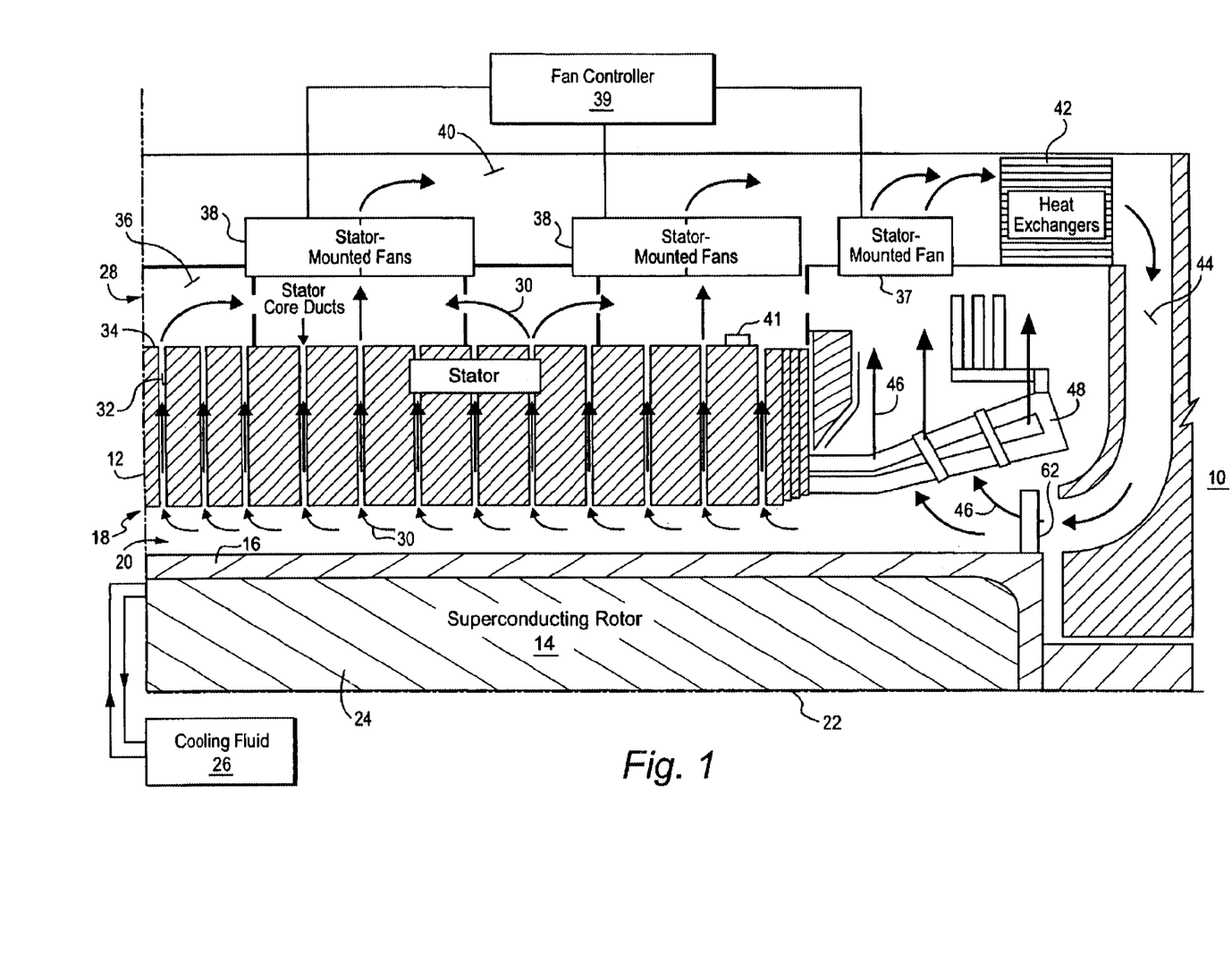
FIG. 1 is a schematic cross-sectional diagram of a quarter-section of a generator showing a forced air, forward flow stator cooling system with stator mounted fans.

FIG. 1 shows an exemplary synchronous electrical machine 10 having a stator 12 and a forward flow ventilation system 28, in which cooling gas (arrows 30) flows from the rotor air gap 20, and through the stator. The cooling gas flows through the radial gas passages 32 in the stator 12. The cooling gas removes heat from the stator. Stator mounted fans 38 control the cooling gas flow rate and thereby regulate the stator temperature.

The machine 10 has a stator 12 and a rotor 14. The machine 10 is shown as a generator, but it may also be an electric motor or other synchronous electrical machine. In a generator, the rotor includes field winding coil 16 that fits inside the cylindrical rotor cavity 18 of the stator. An annular machine air gap 20 is formed between the outside periphery of the rotor and the cylindrical surface of the stator that defines the cylindrical rotor cavity 18 which receives the rotor. As the rotor 14 turns within the stator, a magnetic field generated by the rotor and rotor coils rotates through the stator and creates an electrical current in the windings of the stator coils. This current is output by the generator as electrical power.

The rotor 14 has a generally longitudinally-extending axis 22 and a generally solid rotor core 24. The solid rotor core has high magnetic permeability, and is usually made of a ferromagnetic material, such as iron. In a low power density superconducting machine, the iron core of the rotor is used to reduce the magnetomotive force (MMF), and, thus, minimize the amount of superconducting (SC) coil wire needed for the coil winding 16.

The rotor 14 supports at least one longitudinally-extending, racetrack-shaped, high-temperature superconducting (HTS) coil winding 16. The HTS coil winding may be alternatively a saddle-shape or have some other shape that is suitable for a particular HTS rotor design. The HTS coil winding 16 is cooled by cryogenic fluid or gas supplied to the rotor by an outside source 26 of cooling fluid. The cooling of the rotor and its HTS coils is independent of and isolated from cooling systems for other components of the generator 10, such as the stator 12.

In a superconducting synchronous machine, the rotor field winding is cooled to cryogenic temperatures by a cryorefrigeration system that includes its own self-contained rotor cooling circuit. A cold, cryogenic coolant is supplied to the rotor through a transfer coupling. The coolant flows through a cooling circuit in the rotor where it extracts heat from a superconducting rotor coil, and then returns to a stationary cooling system through the transfer coupling. The cryogenic cooling system provides effective cooling of the rotor in a superconducting machine. The cryogenic cooling system does not cool the stator.

From the outer periphery 34 of the stator core, the heated cooling gases 30 pass through annular ducts 36 that surround the stator core, and direct the hot gases to the stator mounted fans 38. The fans 38 force cooling gas from the ducts 36 and draw the gas from the stator 12. The stator mounted fans 38 control the flow of cooling gas through the stator and control stator cooling. The stator mounted fans have the capacity to draw a greater volume of cooling gas through the stator than was conventionally achieved with rotor mounted fans that forced air into or out of the stator-rotor gap 20. The stator mounted fans are controlled by a fan controller 39, such as by adjusting the fan speed to provide a desired cooling gas flow through the stator. The hot gases exhaust from the fans 38 into a plenum chamber 40, and flow into a heat exchanger 42. Gas flows through the fan into the annular plenum 40, through the heat exchangers 42, and into the return duct 44 at the front end of the generator.

The rate of cooling air or hydrogen flow through the stator passages is controlled by the stator fans, which are controlled by the fan controller. Fan controllers may be used for all embodiments of the ventilation systems disclosed herein. For example, the fan controllers may adjust the fan speed and hence cooling gas flow so as to maintain a uniform temperature of the stator windings. Temperature sensors 41 located at one or several locations in the stator core, the stator slots or the stator winding itself may provide a temperature feed back signal of the stator temperature to the fan controller which in turn adjusts the fan speed so as to increase or decrease the cooling gas flow through the stator depending on whether the stator temperature is above or below the desired stator temperature, respectively. For this purpose, different types of temperature sensors may be applied including sensors that measure temperatures at individual locations (point measurements) or sensors that provide information on the temperature distribution along a prescribed geometric path (distributed thermal sensors).

The stator mounted fans 38 may include two annular fan assemblies mounted around the stator to draw hot cooling gas from the annular ducts 36 surrounding the stator. These stator mounted fans may be controlled by the fan controller 39 to adjust the fan speed to provide the optimal cooling flow needed to maintain the stator at a desired relatively uniform operating temperature. In addition, another annular stator mounted fan 37, may be positioned adjacent the stator end turns 48 so as to draw cooling gas 46 over the end turns. The stator mounted fans for the different sections of the stator may be controlled by a single fan controller, or may be individually controlled to provide various cooling flows through the different sections of the stator.

The size, design, and control of each stator fan may be optimized such that the fan is matched to the cooling flow resistance through the portion of the stator passages aligned with that fan. Similarly, the number and position of the fans on the stator frame may be selected to provide for substantially uniform temperature of the armature winding in the stator and the stator core along the axial length of the machine.

The control of the fans may be adjusted to achieve various benefits. For example, reducing the fan speed also reduces the audible windage noise from the machine. The fan speed can be reduced, for example, when the machine is operating at part load and less heat is being generated in the armature and stator core. Further, if number and size of the stator mounted fans is selected to exceed the stator cooling capacity of the machine at its rated load, then there will be additional stator cooling capacity available if the machine is operated beyond its rated load or the ambient temperature becomes excessive. Another potential benefit of the stator mounted fans is that they may be operated before the machine starts or after the machine stops so as to provide stator cooling even while the machine is at a standstill.

A rotor mounted fan 62 may or may not be used with a stator mounted fan to increase the gas flow through the air gap 20 between the rotor and stator. The speed of the rotor mounted fan is a function of rotor speed and, thus, increases the flow of cooling gas through the stator as the rotor speed increases. As most industrial gas turbines operate at a relatively steady rotor speed, the rotor fan provides a uniform force to the cooling gas flow through the ventilation system. The ventilation scheme may also be implemented without the rotor mounted fan 26 in which case all of the cooling gas is routed through the stator core without any rotor mounted fans, representing a major change in the state of the art of ventilation configurations of large utility type turbine generators.

The hot gases from the stator and fans are cooled in heat exchanger 42, flow through recirculation ducts 44 and back into the machine air gap 20. The cooling gases are driven into the gap 20 by centrifugal forces in the rotor, a rotor mounted fan 62 and by the gas flow through the stator drawn by the fans 33. In addition, some of the cooling gases 46 are directed from the ventilation return passage 44 to cool the end turns 48 of the stator coil windings. Cooling gas not flowing past the end turns, flows into the machine air gap 20 and then enters the stator passages 32 at the stator inner periphery of the rotor cavity 18.

Figure 2:
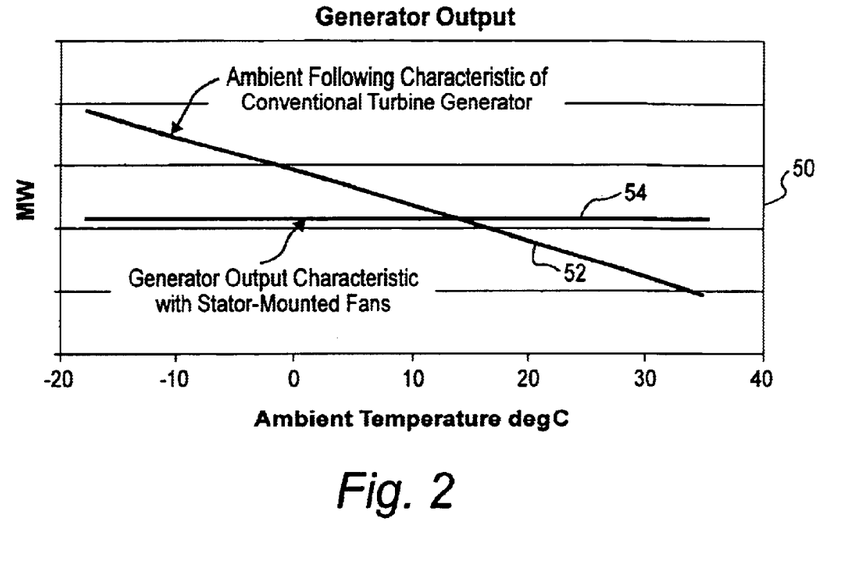
FIG. 2 is a graph showing generator output power verses ambient temperature for both a conventional turbine generator and a generator with stator mounted fans.

FIG. 2 is a graph 50 showing the influence that ambient temperature (degrees Celsius) surrounding a power plant can have on the power output (megawatts—MW) of the equipment in the power plant. Turbine generators can be driven by two types of prime movers: steam turbines or combustion turbines such as gas turbines. The power output of a steam turbine does not vary with ambient temperature conditions whereas the output of the gas turbine is reduced as ambient temperature increase. The steam turbine characteristic is fairly flat, much like line 54 in figure 50. On the other hand, the output of a gas turbine is a strong function of ambient temperature, and generally has a characteristic with a negative slope, similar to the line 52 shown in figure 50. Since the mechanical power provided by the prime mover has to be converted by the generator to electric power, the output characteristic of the generator has to be coordinated with the turbine characteristic so that the output power of the power train is not limited by the generator capability. Since the two different types of prime movers have two different output characteristics (lines 52 vs 54) it becomes difficult to design one generator that can cost-effectively match both different turbine characteristics. This difficulty invariably leads to generators that are overdesigned over most parts of the ambient temperature range in order to meet the turbine output in the entire temperature range.

The power output of a generator with conventional ventilation configurations has a tendency to be reduced for higher ambient temperatures and follows a general trend line similar to line 54. The negative slope is more pronounced in open ventilated air-cooled machines than in TEWAC designs where the generator heat is rejected through heat exchangers whose inlet cooling temperature is less of a function of ambient temperature.

Figure 3:
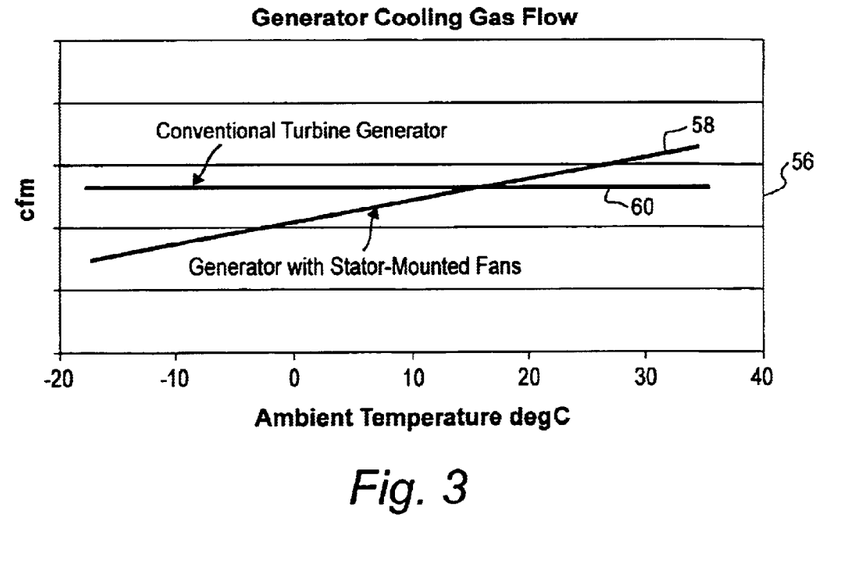
FIG. 3 is a graph of cooling gas flow through a generator verses ambient temperature for both a conventional generator and a generator with stator mounted fans.

In a ventilation configuration with stator mounted fans the cooling gas flow through the stator core can be controlled so that the generator output characteristic follows a desired curve. This allows to obtain a generator output characteristic that is decoupled from ambient temperatures. In particular, a constant output characteristic of line 52, as well as a sloped characteristic of line 54, can be accomplished, or any characteristic in between. With such a ventilation configuration it is substantially easier to coordinate the output characteristic of the generator with the two different prime movers of steam and gas turbines of same nominal ratings but different ambient following characteristics. FIG. 3 is a graph 56 showing that a stator mounted fan can increase the cooling gas flow (cubic feet per minute—cfm) through the stator as the ambient temperature increases. Increasing the cooling gas flow through the stator ventilation system as the ambient temperature increases cools the generator to reduce the effect that the ambient temperature has on generator power output, as shown by line 54 in FIG. 2. As shown by the positively sloped line 58, the flow of cooling gas through the stator ventilation system can be controlled as a function of ambient temperature by controlling the stator mounted fans. A fan controller 39 (see FIG. 1) may be used to adjust the stator fan 38 speed(s) to achieve cooling gas flow shown by line 58 in FIG. 3. A conventional ventilation system, without a stator mounted fan or a fan controller, has a relatively constant flow of cooling gas through the stator a function of ambient temperature, as shown by line 60.

Figure 4:
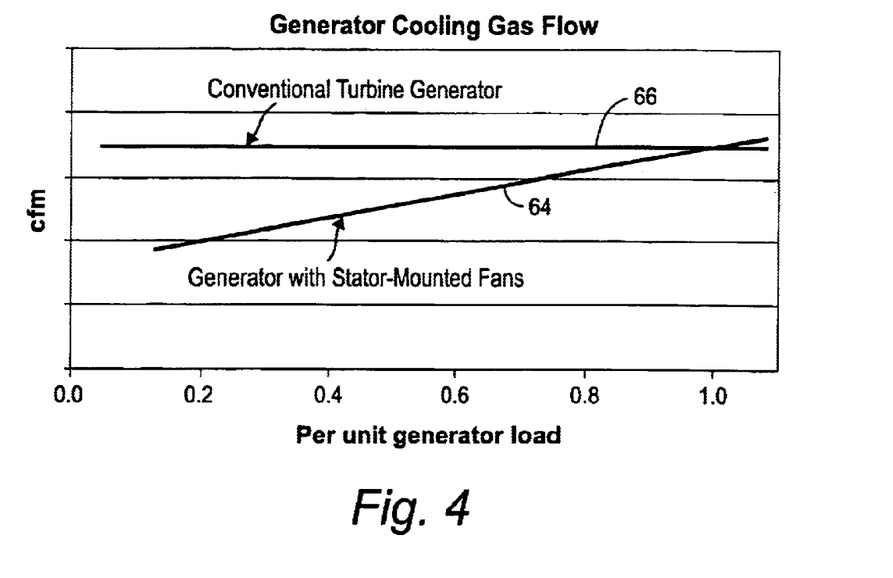
FIG. 4 is a graph of generator cooling gas flow verses generator load for both a conventional generator and a generator with stator mounted fans.
Figure 5:
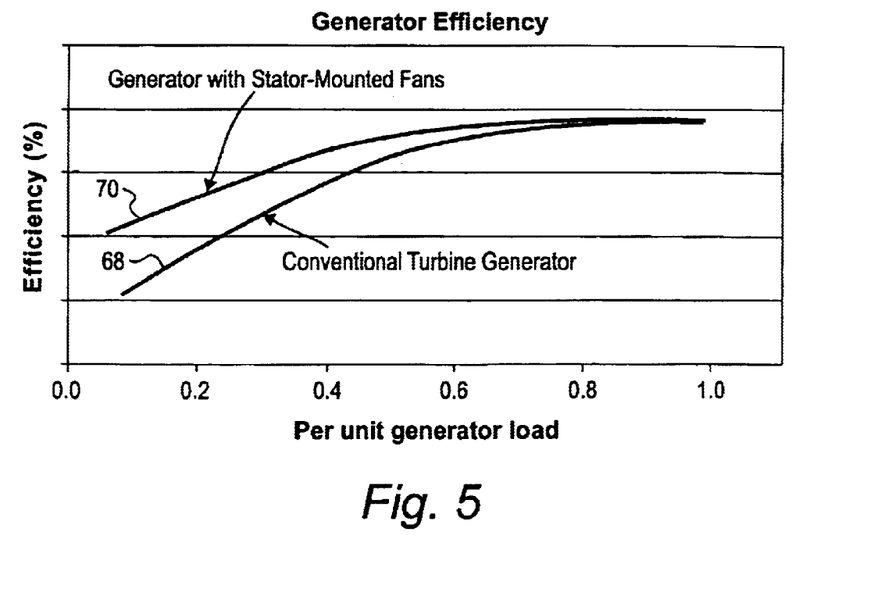
FIG. 5 is a graph of generator efficiency verses generator load for a conventional generator and a generator with stator mounted fans.

FIG. 4 shows that a stator mounted fan can be used to increase the cooling gas flow through the stator ventilation system as the load on the generator increases, as is evident from sloped line 64. A rotor mounted fan has a relatively constant speed when the generator is at normal operating speed, and thus the cooling as flow rate through the stator is constant, see line 66, even while the load on the generator increases. A load increase generally increases the operating temperatures in the generator and such temperature changes can affect the power output and efficiency of the generator. See, e.g., FIG. 2. The speed of a stator mounted fan can be adjusted by the fan controller 39 to increase the cooling gas as the load on the generator increases and thereby improve the cooling of the stator by the ventilation system. The flow through the stator can also be adjusted to the generator load by switching selected fans on as load increases or off as load is reduced FIG. 5 is a graph that shows a generator efficiency improvement due to a stator mounted fan. The stator mounted fan can compensate, at least in part, for changes in generator heat rejection due to changes in generator load and ambient temperature. The ventilation cooling system can more efficiently cool the stator, such as for example by maintaining the stator and generator at a more constant temperature. The ventilation system of a conventional turbine generator, line 68, may be optimized for high load conditions. The cooling is less than optimal during low load conditions, e.g., below fifty percent (0.5) load capacity, because the stator is excessively cooled and operates at a lower than optimal temperature. Because of sub-optimal cooling, the efficiency of the generator may be unfavorably reduced at low loads due to the ventilation of the generator.

A stator mounted fan, see line 70, improves the efficiency of the generator by allowing the flow of cooling gas to be optimal over a wide-range of generator loads and ambient temperatures.

Figure 6:
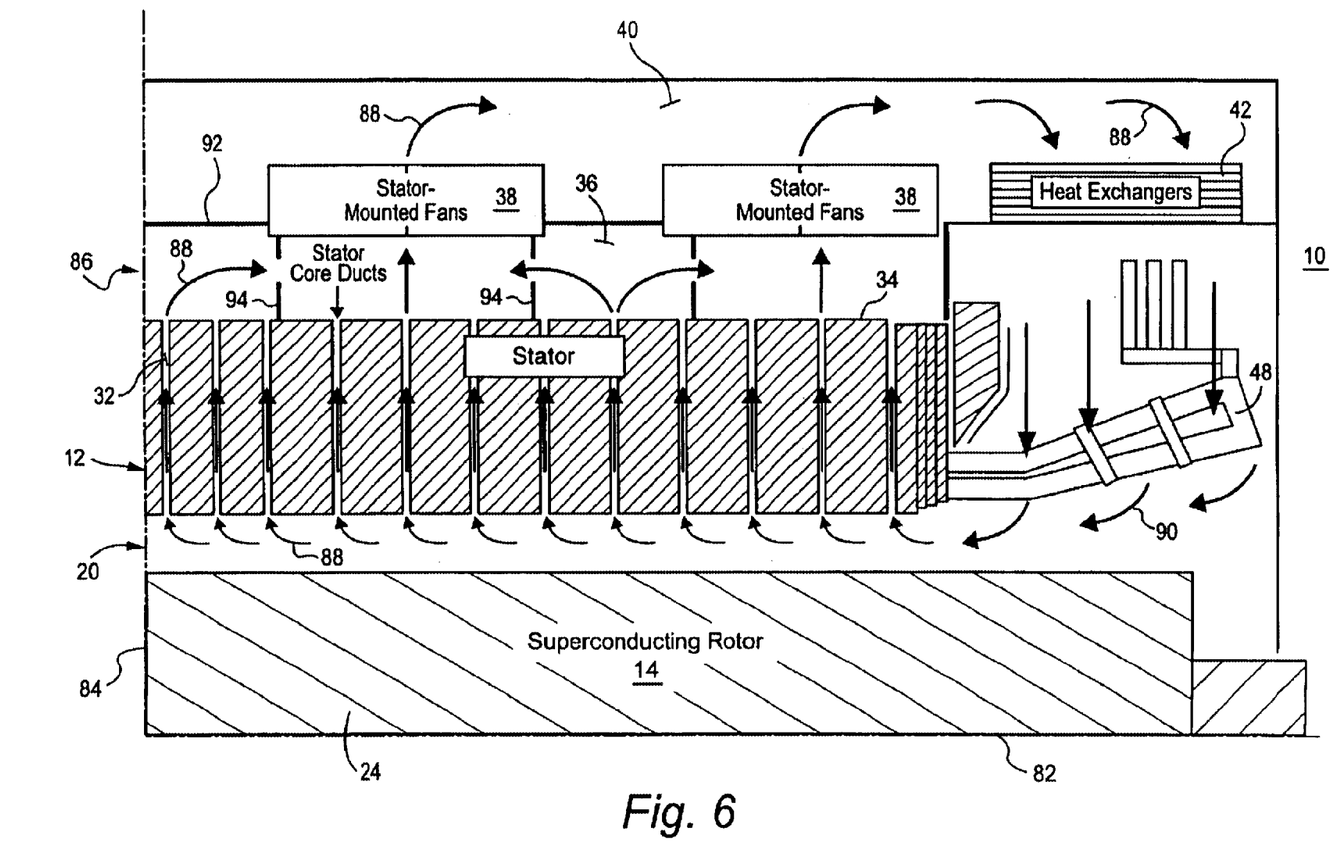
FIG. 6 is a schematic cross-sectional diagram of a quarter-section of a generator showing a second embodiment of a forced air, forward flow cooling system with stator mounted fans.

FIG. 6 shows a cross-section of one-quarter of a generator 10 (see rotor axial center-line 82 and longitudinal center-line 84) having a forward flow, ventilated stator cooling system 86. The cooling system provides cooling gas 88, e.g., ambient air or hydrogen, to the stator 12 and the cooling gas passages 32 in the stator. The stator cooling system 86 is independent of and isolated from the cryogenic cooling system that provides cryogen cooling fluid to the rotor.

Heat is extracted from the stator coils as the cooling gas passes through the stator cooling passages 32. The passages may be arranged in the stator to optimize the cooling of the stator coils. For example, the frequency of cooling passages along the stator axis and/or the cross-sectional area of the passages may be selected to evenly distribute cooling in the stator or to otherwise optimize stator cooling.

The annular duct 36 may have an outer cylindrical wall 92 that circumferentially surrounds the stator and has openings and mounts for the stator mounted fans 38. The duct 36 may also include annular baffle walls 94 extending from the stator to the cylindrical wall 92 to direct air from the stator passages 32 to the fans 38. The baffle walls have apertures to allow cooling gas to flow to the stator fans, and are arranged to promote the relatively uniform flow of gas through all of the stator passages.

The annular plenum chamber duct 40 directs the hot high pressure or high velocity gas from fans 38 and directs the gas 88 to one or more heat exchangers 42. The heat exchangers 42 extract heat from the gas so that it may be recirculated to cool the stator. In this embodiment, the cooled gas from the heat exchanger(s) flows directly across the end-turns 48 of the stator, in contrast to the ventilation system shown in FIG. 1. The cooling gas 90 flows from the end-turns and into the machine air gap 20 between the rotor and stator. As the gas flows through the air gap, it is distributed along the length of the rotor and enters the cooling passages 32 of the stator. The cooling gas may enter at just one end or at both ends of the rotor 82. In this embodiment of the stator ventilation system 86, the cooling gas is recirculated through the stator and a heat exchanger 42 removes heat from the cooling gas before it is recirculated through the stator.

Figure 7:
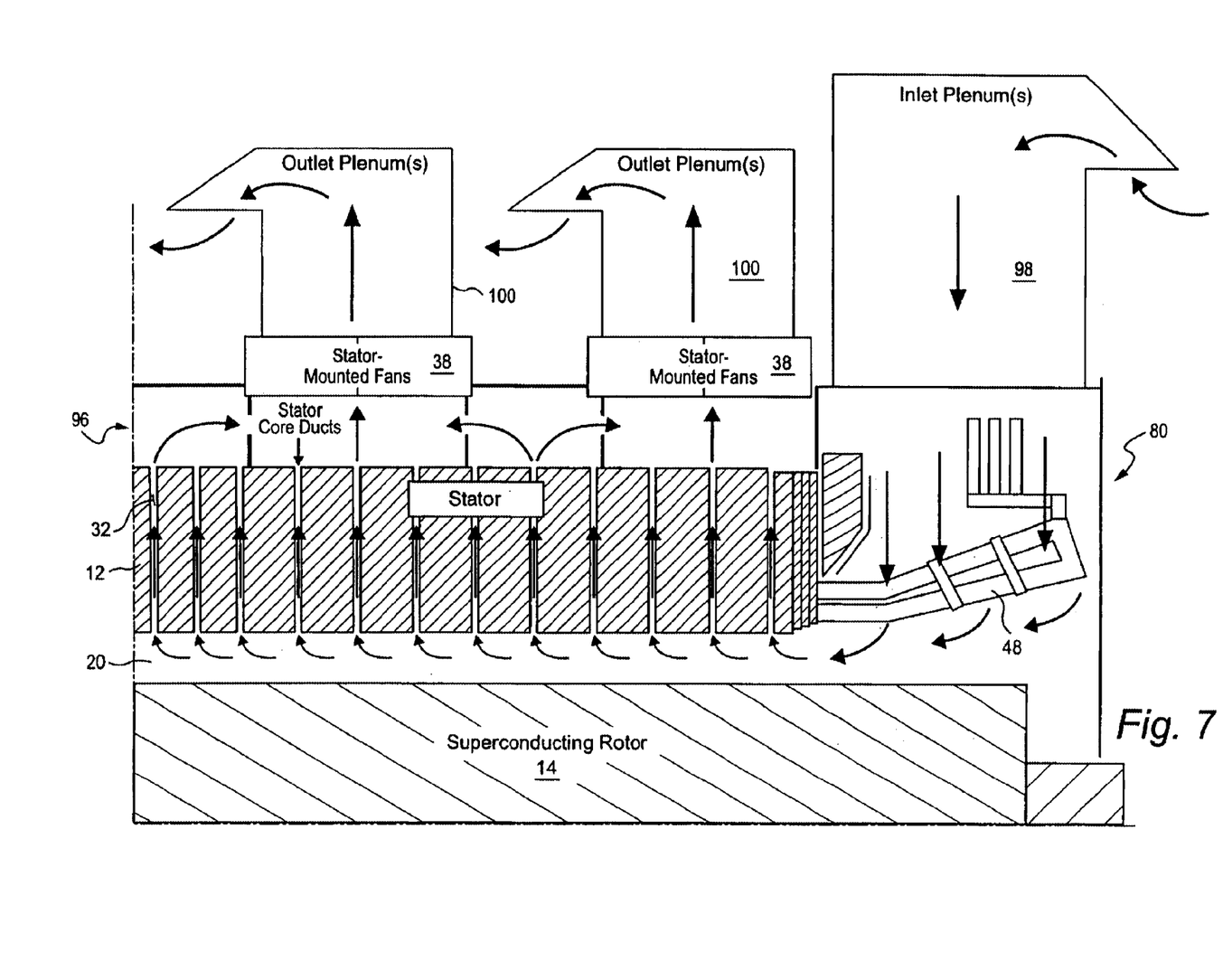
FIG. 7 is a schematic cross-sectional diagram of a quarter section of a generator showing a third embodiment of a forced air, forward flow cooling system with stator mounted fans.

FIG. 7 is a schematic cross-sectional diagram of a quarter section of a generator showing a third embodiment of a forced air, forward flow cooling system 96 with stator mounted fans. Whereas the second ventilation system embodiment 86 is a closed loop system in which cooling gas is recirculated (as shown in FIG. 6), the third embodiment 96 is an open looped system in which cooling gas flows through the stator 12 in a single pass and is then exhausted to ambient air. One of the benefits of an open loop cooling system is that a return duct (see 40 and 44 in FIG. 1) is not needed and thus the overall size of the machine may be reduced.

In the third embodiment 96, cooling gas enters an inlet plenum 98 at one or both ends of the generator 80. The cooling gas may be ambient air. Air flows from the inlet plenum over the end turns 48 of the stator windings, into the air gap 20 and stator passages 32, through the stator fans 38, and out through outlet plenums 100. Heat exchangers are unnecessary because the heated cooling gas is exhausted to the atmosphere, and replaced by ambient air drawn in through the inlet plenum 98. The fans may also be external to the stator frame and within the duct.

Figure 8:
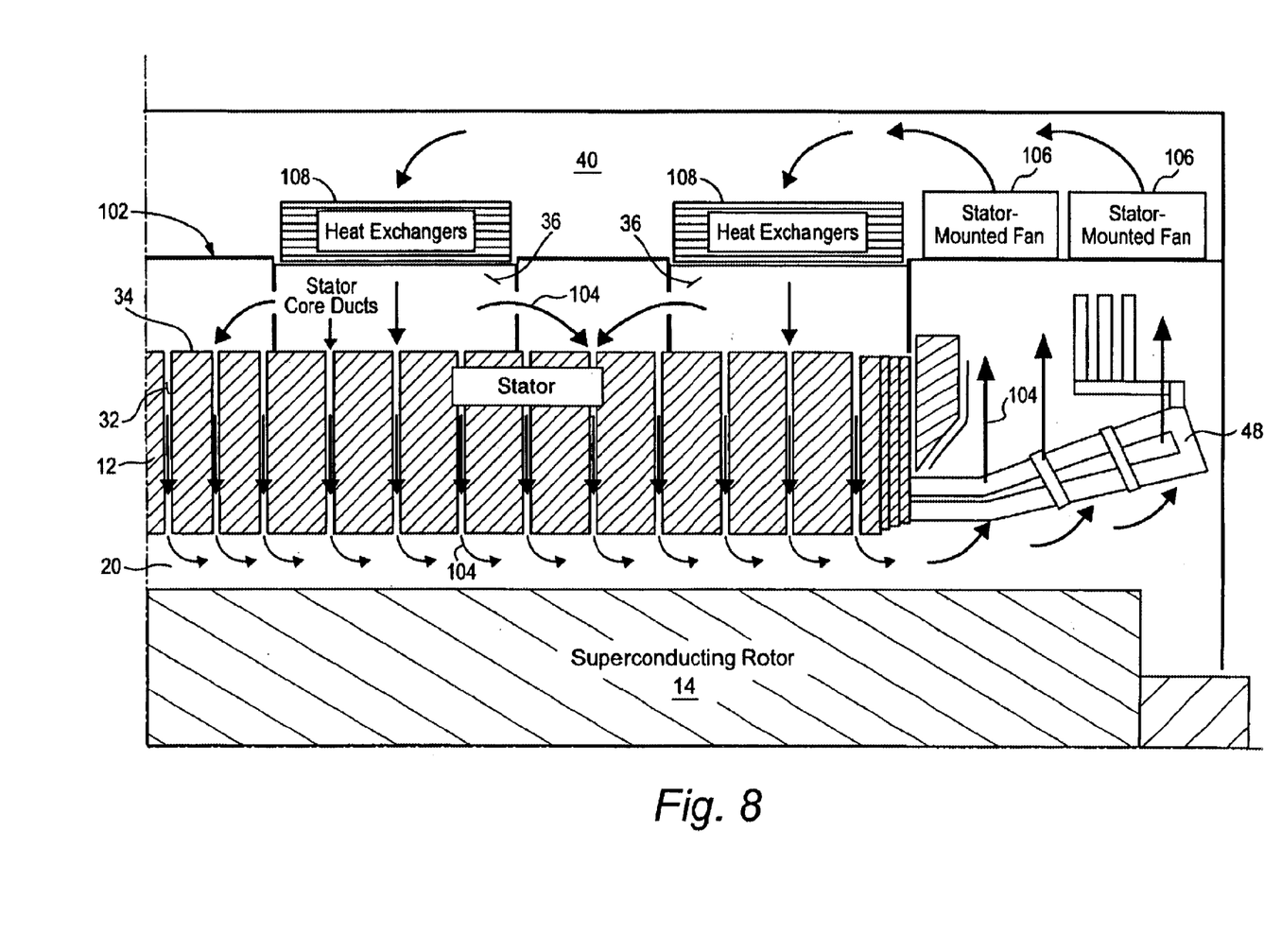
FIG. 8 is a schematic cross-sectional diagram of quarter section of a superconducting generator having an embodiment of a forced air, reverse flow cooling system.

FIG. 8 is a schematic cross-sectional diagram of quarter section of a superconducting generator having an embodiment of a forced air, reverse flow cooling system 102. In a reversed flow ventilation system cooling gas flows 104 into the stator passages at the outer periphery 34 of the stator, through the stator passages 32 and out into the air gap 20 between the rotor 14 and stator 12. In a reverse flow ventilation system 102, the flow through the stator passages 32 is opposite to the cooling gas flow in a forward flow ventilation system.

Heated cooling air flows from the air gap 20 and across the end-turns 48 of the stator winding. Stator mounted fans 106 draw the cooling gas across the end-turns, out of the air gap and from the stator passages. The stator mounted fans 106 control the flow through the stator passages and hence control the cooling of the stator. The stator mounted fans may be positioned around the end-turns 48 at the end(s) of the generator. Cooling gas flows from the stator mounted fans, into a plenum chamber 40 around the stator and through heat exchangers 108 and into ducts 36 before re-entering the stator passages. The heat exchangers remove heat from the cooling gas so that the gas may be recirculated through the stator passages.

Figure 9:
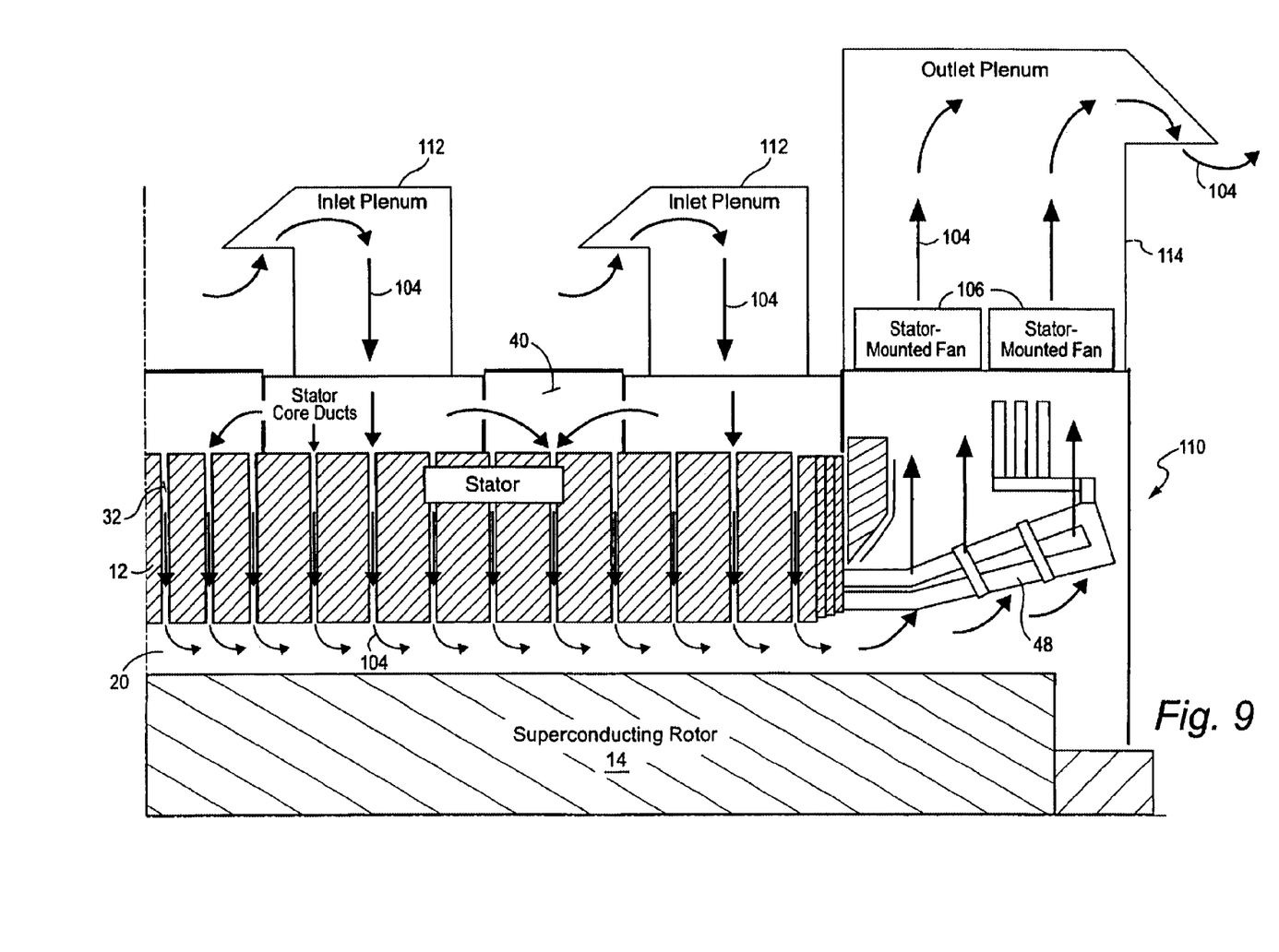
FIG. 9 is a schematic cross-sectional diagram of a quarter section of a superconducting generator having a second embodiment of a forced air, reverse flow cooling system.

FIG. 9 is a schematic cross-sectional diagram of quarter section of a superconducting generator having a second embodiment of a forced air or hydrogen, reverse flow cooling system 110. In the second embodiment, cooling air 104 passes once through the ventilation system and is not recirculated. Air enters inlet plenums 112 arranged around the stator and flows into annular ducts 40 enclosing the stator. The air flows through stator passages 32, the air gap 20, and out of the air gap at the end(s) of the rotor. The heated cooling gas flows across the end-turns 48 of the stator winding so as to cool the end turns. The hot cooling gas is drawn from the stator, air gap and stator coil end turns by stator mounted fans 104. The speed of the fans controls the rate of flow of the cooling gas and hence the cooling of the stator. Hot cooling gas from the stator fans exhaust through outlet plenums 114 mounted at the end(s) of the generator.

The stator cooling systems disclosed herein are also applicable for synchronous machines where a conventional rotor is replaced with a superconducting rotor. In such a case, the forward flow ventilation system of the original machine may be converted to a reverse flow system. A generator built with stator mounted fans can be uprated in the future by increasing either the number or the rating of stator mounted fans to increase the cooling gas flow through the stator core.

The stator ventilation systems with stator mounted fans presented here cover configurations where the stator winding is directly cooled. Direct stator cooling can be accomplished using hollow conductors in the armature winding in predominantly axial direction.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A synchronous machine comprising:
   a rotor coupled to a rotor cooling system, wherein the rotor comprises a cylindrical rotor surface having longitudinal slots and conductive windings arranged in the slots;
   a stator around the rotor and separated from the rotor by an annular gap defined by the rotor and an inner surface of the stator, wherein the stator includes at least one stator cooling passage, wherein the cooling passage is open to the annular gap to allow cooling fluid to flow between the gap and passage, and
   a stator ventilation system in fluid communication with the at least one stator cooling passage, and said ventilation system including a cooling fluid driving device arranged at an outer periphery of the stator, wherein said cooling fluid driving device further comprises a mechanically moving cooling gas displacement device.

2. A synchronous machine as in claim 1 wherein said ventilation system further comprises a heat exchanger and the rotor is turbine driven.

3. A synchronous machine as in claim 1 wherein said rotor comprises a superconducting coil, said rotor cooling system provides cryogenic cooling fluid to said coil and the rotor is turbine driven.

4. A synchronous machine as in claim 1 which is an electromagnetic generator and the rotor is turbine driven.

5. A synchronous machine as in claim 1 which is a motor.

6. A synchronous machine as in claim 1 wherein said ventilation system is a forward flow ventilation system.

7. A synchronous machine as in claim 1 wherein said ventilation system is a reverse flow system.

8. A synchronous machine as in claim 1 wherein said ventilation system is a closed-loop system in which cooling gas circulates through the stator and a heat exchanger in a flow path of the gas.

9. A synchronous machine as in claim 1 wherein said ventilation system is an open-loop system in which cooling gas passes through the stator and the air gap, and exhausts to an environment outside of the machine.

10. A synchronous machine as in claim 1 further comprising a fan controller for regulating a speed of the fluid driving device.

11. A synchronous machine comprising:
a rotor coupled to a rotor cooling system, wherein the rotor comprises a cylindrical rotor surface having longitudinal slots and conductive windings arranged in the slots;
a stator around the rotor and separated from the rotor by an annular gap defined by the rotor and an inner surface of the stator, wherein the stator includes at least one stator cooling passage, wherein the cooling passage is open to the annular gap to allow cooling fluid to flow between the gap and passage, and
a stator ventilation system in fluid communication with the at least one stator cooling passage, and said ventilation system including a cooling fluid driving device arranged around an outer periphery of the stator,
wherein the cooling fluid driving device is at least one stator mounted fan.

12. A synchronous machine as in claim 11 wherein the at least one stator mounted fan is mounted on an outer periphery of annular ducts of the stator.

13. A synchronous machine comprising:
a rotor coupled to a rotor cooling system;
a stator around the rotor and separated from the rotor by an annular gap between the rotor and an inner surface of the stator, wherein the stator includes at least one stator cooling passage, and
a stator ventilation system in fluid communication with the at least one stator cooling passage, and said ventilation system including a cooling fluid driving device arranged around an outer periphery of the stator,
wherein the cooling fluid driving device is at least one stator mounted fan, and
wherein the at least one stator mounted fan is mounted radially outward of an end turn of a stator winding.

14. A superconducting electromagnetic machine comprising:
a rotor having a cryogenically cooled superconducting rotor coil winding, wherein the rotor comprises a cylindrical rotor surface having longitudinal slots and conductive windings arranged in the slots;
a stator coaxial with said rotor and having stator coils magnetically coupled with said superconducting rotor coil winding, said stator coils arranged around said rotor, and said stator having cooling passages extending from an inner periphery of the stator to an outer periphery of the stator, said inner periphery separated from the rotor by an annular air gap, wherein the cooling passages are open to the annular gap to allow cooling fluid to flow between the gap and passage;
said rotor coupled to a cryogenic cooling system;
a stator ventilation system providing cooling gas to said cooling passages of the stator, and said stator ventilation system further comprises at least one fan mounted around the stator.

15. A superconducting electromagnetic machine as in claim 14 further comprising a fan controller regulating a fan speed of the at least one fan.

16. A superconducting electromagnetic machine as in claims 15 wherein said fan controller receives a stator temperature signal, and the fan speed is regulated based on the stator temperature signal.

17. A superconducting electromagnetic machine as in claim 14 which is an electromagnetic generator.

18. A synchronous machine as in claim 14 which is a motor.

19. A superconducting electromagnetic machine as in claim 14 wherein said ventilation system is a forward flow ventilation system.

20. A superconducting electromagnetic machine as in claim 14 wherein said ventilation system is a reverse flow ventilation system.

21. A superconducting electromagnetic machine as in claim 14 wherein said ventilation system is a closed-loop system in which cooling gas circulates through the stator and a heat exchanger in a flow path of the gas.

22. A superconducting electromagnetic machine as in claim 14 wherein said ventilation system is an open loop system.

* * * * *